United States Patent Office 3,486,297
Patented Dec. 30, 1969

---

3,486,297
LIQUID AND GAS PUMPING UNIT
Simon Eisinga and Lourens Keet, Edmonton, Alberta, Canada, assignors, by mesne assignments, to Esso Production Research Company, Houston, Tex., a corporation of Delaware
Continuation-in-part of application Ser. No. 529,502, Feb. 23, 1966. This application Oct. 6, 1967, Ser. No. 677,494
Int. Cl. B01d 53/00
U.S. Cl. 55—21      10 Claims

ABSTRACT OF THE DISCLOSURE

A system for transmitting liquid and gas through a pipeline wherein an initial stream of fluid is separated into liquid and gaseous components, the separated gaseous component is compressed, and the liquid component and the compressed gaseous component are introduced into said pipeline in sequence.

CROSS REFERENCES TO RELATED APPLICATIONS

This application is a continuation-in-part of Ser. No. 529,502, filed Feb. 23, 1966, now abandoned.

BACKGROUND OF THE INVENTION

Field of the invention

This invention relates to the transmission of liquids and gases through pipelines.

Description of the prior art

The fluids produced from oil and gas wells normally include both liquid and gaseous components. These components are generally separated from one another near the wells and then transported to refineries and other destinations through crude oil pipelines and natural gas transmission lines. Separate facilities for handling the liquids and gases are necessary because of difficulties in pumping mixtures of the two. The presence of even small quantities of gas in a liquid stream results in a marked reduction in the efficiency of conventional pumps and leads to cavitation problems and other difficulties. The inclusion of liquids in a gas stream has a similar effect on the operation of conventional compressors. The equipment necessary to separate the liquids and gases and handle them in this manner requires a considerable investment and is expensive to operate. Much of this could be eliminated if liquids and gases could be transported efficiently through a single pipeline.

SUMMARY OF THE INVENTION

This invention provides a method and apparatus for the transmission of liquid and gas through pipelines and similar conduits which alleviates the problems outlined above. The method utilized involves the separation of an initial mixture of liquid and gas into liquid and gaseous components, the compression of the separated gaseous component, and the subsequent introduction of the liquid component and the compressed gaseous component into the pipeline in sequence. The method is preferably carried out by introducing the mixture of liquid and gas into a first gas-liquid separator where the two phases are separated from one another. Gas is discharged from this first separator into the intake line of a gas compressor. High pressure gas from the compressor is initially passed through a second gas-liquid separator into a pipeline or similar conduit. During this initial stage of the operation, liquid separated from the incoming mixture accumulates in the first separator until a predetermined volume is collected.

After sufficient liquid has accumulated in the first separator, the cycle is changed and the incoming fluids are diverted to the second separator. The discharge of gas through the second separator is simultaneously terminated. The gas separated in the second unit passes overhead to the compressor and is then discharged into the upper portion of the first separator. Gas pressure in the first separator forces the accumulated liquid into the pipeline. After the liquid has been discharged, gas flows into the pipeline and thus serves to propel the liquid. This continues until the desired volume of liquid has accumulated in the second separator, at which point the cycle is again reversed.

The system thus employed permits the efficient two-phase transmission of liquid and gas by imparting energy directly to the gas and only indirectly to the liquid. It does away with the need for separate pipelines and for a separate pump for the liquids, eliminates the necessity for reducing the incoming stream to atmospheric pressure, and avoids the use of storage tanks and equipment for the recovery of stock tank vapor. It therefore has many advantages over separate handling techniques currently in use.

DESCRIPTION OF THE PREFERRED EMBODIMENTS

Figure 1:
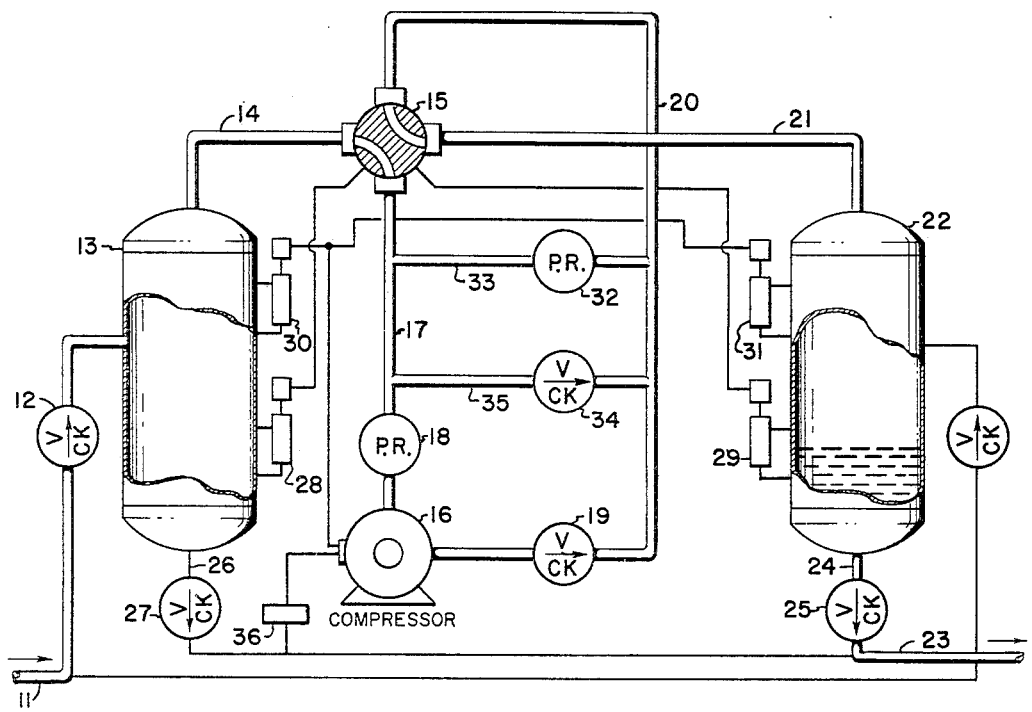
FIGURE 1 is a schematic illustration of the apparatus of the invention during one phase of the cyclic operation.

As shown in FIGURE 1, the apparatus of invention includes a liquid-gas separator 13 into which a mixture of liquid and gas is introduced from an oilfield gathering line 11 through a check valve 12. The separator may be of conventional design. The lower portion of separator 13 is connected to line 23 by means of line 26 and check valve 27. Gas from the separator is passed by line 14 to one port of a two-position, four-way motor valve or similar device 15. With the valve in the position shown in FIGURE 1, gas from line 14 is supplied to a conventional gas compressor 16 through intake line 17 and pressure regulator 18. High pressure gas is discharged from the compressor through check valve 19 and line 20, which is connected to another port of valve 15. Gas from line 20 is diverted by valve 15 through line 21 to the upper portion of a second liquid-gas separator 22, which may also be of conventional design. The lower portion of this second separator is connected to a transmission line or similar pipeline 23 by line 24 containing check valve 25.

Liquid-gas separators 13 and 22 are equipped with float switches 28 and 29, respectively, which are responsive to the liquid level in the separators. When actuated, each of the float switches operates to reverse the position of motor valve 15. The two separators are also equipped with high level shut-down switches 30 and 31, respectively. These are also responsive to the liquid level in the separators. The high level switches are a safety precaution to prevent inadvertent entry of liquid into the intake line of compressor 16. When actuated, either switch will disconnect the compressor from the power supply. Pressure regulator 32 in line 33, which connects compressor discharge line 20 with compressor intake line 17, permits the recycling of make-up gas from the compressor discharge to the intake line if the upstream pressure at regulator 18 temporarily drops below the downstream pressure setting of regulator 18. Check valve 34 in line 35, which also connects intake line 17 with compressor discharge line 20, permits immediate pressure equalization of the high pressure condition in separator 22 with the low pressure condition in separator 13, following the reversal of motor valve 15 by float switch 28.

Figure 2:
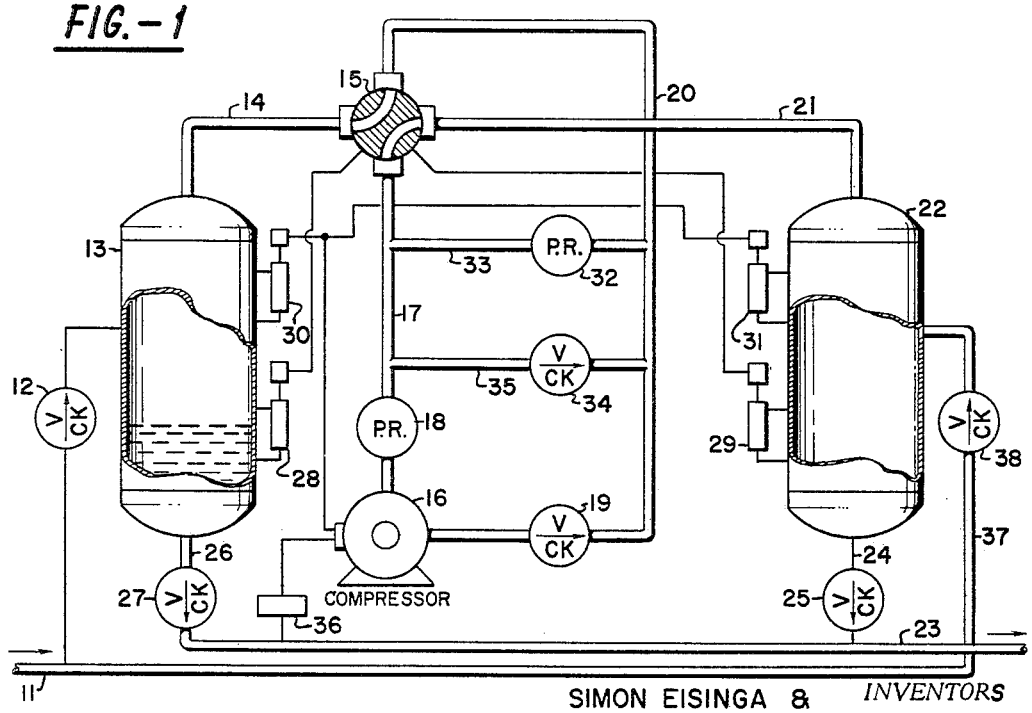
FIGURE 2 is a schematic view illustrating the alternate phase of operation.

FIGURE 2 depicts the alternate operating phase of the invention. The equipment differs from that illustrated in FIGURE 1 only by the position of four-way valve 15. The position of this valve is automatically switched from the position shown in FIGURE 1 to that shown in FIGURE 2 by the action of float switch 28, in response to the liquid level in separator 13. The influx of fluids is thereby diverted from separator 13 to separator 22 by line 37 containing check valve 38. During this phase of the operation, gas entering separator 22 is removed overhead by line 21 and is passed through line 17 to the intake of compressor 16. Compressed gas is discharged by way of check valve 19 and line 20 and passes through valve 15 and line 14 into the upper portion of separator 13. Pressure in separator 13 forces liquid from the bottom of the separator through line 26 and check valve 27 into line 23. Once accumulated liquid in separator 13 is completely discharged into line 23, compressed gas continues to pass through the separator and into the transmission line until the accumulation of liquid in separator 22 causes the liquid level to actuate float switch 29, whereupon valve 15 is again reversed and the operation reverts to that shown in FIGURE 1. This sequence of events is carried out repeatedly. In the event of excessive pressure buildup in the downstream line, high pressure switch 36 is actuated, causing an emergency shutdown of the compressor system.

Although the invention has been described in terms of a system for boosting the pressure of a stream containing liquid and gaseous hydrocarbons at an oilfield lease gathering facility for transmission over short distances, it will be apparent that the concept of the invention is equally applicable for the transmission of oil and gas streams and other two-phase fluid systems over great distances. The method disclosed is not restricted to the particular equipment shown in the drawing and instead can be carried out with other apparatus.

What is claimed is:

1. A method for transmitting a liquid and gas through a pipeline which comprises:
   (a) separating a mixture of liquid and gas into a liquid component and a gaseous component in a first liquid-gas separation zone;
   (b) passing said gaseous component from said first separation zone to a gas compression zone;
   (c) compressing said gaseous component in said gas compression zone;
   (d) passing compressed gas from said gas compression zone through a second liquid-gas separation zone into said pipeline until a predetermined quantity of liquid has accumulated in said first separation zone;
   (e) thereafter separating a mixture of liquid and gas into a liquid component and a gaseous component in said second separation zone;
   (f) passing the gaseous component separated in said second separation zone from said second zone to said gas compression zone;
   (g) compressing the gaseous component from said second separation zone in said gas compression zone; and
   (h) passing compressed gas from said gas compression zone into said first separation zone to displace said accumulated liquid from said first separation zone into said pipeline.

2. A method as defined by claim 1 including the further step of equalizing the pressure between said first and second separation zones each time a predetermined volume of liquid accumulates in either separation zone.

3. A method as defined by claim 1 including the additional step of regulating the pressure upstream and downstream of said gas compression zone by recycling compressed gas through said compression zone when the pressure drops upstream of said compression zone.

4. A method for transmitting a liquid and gas through a pipeline which comprises:
   (a) separating a mixture of liquid and gas within a separation zone into a liquid component and a gaseous component;
   (b) discharging the separated gaseous component from said separation zone to a compression zone;
   (c) compressing said discharged gaseous component within said compression zone to a pressure in excess of that within the separation zone; and
   (d) sequentially introducing said liquid component and the compressed gaseous component into said pipeline so that said gas propels said liquid through said pipeline.

5. Apparatus for transmitting a liquid and gas through a pipeline which comprises:
   (a) a liquid-gas separator for separating an input mixture of liquid and gas into a liquid component and a gaseous component, said separator including an inlet and separate liquid and gas outlets,
   (b) a gas compressor,
   (c) means for transferring separated gas from said liquid-gas separator to said compressor, and
   (d) means for sequentially introducing liquid separated from said input mixture and gas compressed by said compressor into said pipeline so that said gas propels said liquid through said pipeline.

6. Apparatus for transmitting a liquid and gas through a pipeline which comprises:
   (a) a first liquid-gas separator;
   (b) a second liquid-gas separator;
   (c) means for charging an input mixture of liquid and gas to said first separator and to second separator alternately;
   (d) a gas compressor;
   (e) means for transferring separated gas alternately from said first separator and from said second separator to said compressor; and
   (f) means for sequentially introducing liquid separated from said input mixture and gas compressed by said compressor into said pipeline so that said gas propels said liquid through said pipeline.

7. Apparatus as defined by claim 6 including means for transferring gas between the upper part of said first separator and the upper part of said second separator through said gas compressor.

8. Apparatus as defined by claim 7 including means for reversing the direction in which gas is transferred between the upper part of said first separator and the upper part of said second separator without reversing the direction of said gas compressor.

9. Apparatus as defined by claim 8 including means for equalizing the pressure in said first separator and said second separator on reversing the direction in which gas is transferred between said separators.

10. Apparatus as defined by claim 8 including float switches in said first and second separators for actuating said means for reversing the direction in which gas is transferred between said separators in response to the accumulation of predetermined volumes of liquid in said separators.

References Cited

UNITED STATES PATENTS

| | | | |
|---|---|---|---|
| 1,116,931 | 1/1914 | Schutt | 55—216 X |
| 1,194,223 | 8/1916 | Pearce | 137—156 |
| 2,160,501 | 5/1939 | Hedges et al. | 137—208 X |
| 2,768,703 | 10/1956 | Parks | 55—57 X |
| 2,812,860 | 11/1957 | Dilworth | 137—156 X |
| 2,978,063 | 4/1961 | Ford et al. | 55—160 |
| 3,157,131 | 11/1964 | Bardon. | |
| 3,097,215 | 7/1963 | Courter et al. | 55—23 X |

REUBEN FRIEDMAN, Primary Examiner

JOHN W. ADEE, Assistant Examiner

U.S. Cl. X.R.

55—25, 46, 57, 166, 170; 137—208